(12) United States Patent
Caputo

(10) Patent No.: US 8,499,670 B2
(45) Date of Patent: Aug. 6, 2013

(54) MODULAR BLIND CUTTING CENTER

(75) Inventor: Thomas A. Caputo, Greensboro, NC (US)

(73) Assignee: Newell Window Furnishings, Inc., Freeport, IL (US)

(*) Notice: Subject to any disclaimer, the term of this patent is extended or adjusted under 35 U.S.C. 154(b) by 1287 days.

(21) Appl. No.: 10/611,187

(22) Filed: Jul. 1, 2003

(65) Prior Publication Data

US 2004/0069104 A1  Apr. 15, 2004

Related U.S. Application Data

(63) Continuation-in-part of application No. 09/911,292, filed on Jul. 23, 2001, now Pat. No. 6,604,443.

(51) Int. Cl.
*B26D 1/04* (2006.01)

(52) U.S. Cl.
USPC .............. 83/196; 83/198; 83/549; 83/553; 83/618

(58) Field of Classification Search
USPC ............. 83/553, 615, 13, 564, 167, 513, 516, 83/522.19, 684, 454, 197, 452, 602, 622, 83/618, 648, 527, 701, 859, 198, 196, 549, 83/DIG. 2; 29/24.5; 144/252.2; 483/55; 408/14
See application file for complete search history.

(56) References Cited

U.S. PATENT DOCUMENTS

| | | |
|---|---|---|
| 239,691 A | 4/1881 | Appleton |
| 421,027 A | 2/1890 | Hammond |
| 702,200 A | 6/1902 | Greene |
| 1,382,433 A | 6/1921 | McCarty |
| 1,647,254 A | 11/1927 | Simmons |
| 1,721,276 A | 7/1929 | Marsilius |
| 1,792,522 A | 2/1931 | Yates |
| 1,924,162 A | 8/1933 | Mason |
| 2,044,481 A | 6/1936 | Manley et al. |
| 2,057,488 A | 10/1936 | Hochstadt |
| 2,247,314 A | 6/1941 | Sellmeyer |
| 2,418,515 A | 4/1947 | Lewis |
| D155,897 S | 11/1949 | Huntington |
| 2,631,508 A | 3/1953 | Muehling |
| 2,644,520 A | 7/1953 | Nelson |
| 2,691,994 A | 10/1954 | Ferguson |

(Continued)

FOREIGN PATENT DOCUMENTS

| | | |
|---|---|---|
| CA | 2136519 | 5/1996 |
| CA | 2 355 507 | 2/2003 |

(Continued)

*Primary Examiner* — Phong Nguyen
(74) *Attorney, Agent, or Firm* — Marshall, Gerstein & Borun LLP

(57) ABSTRACT

A blind cutting apparatus includes a support surface adapted to support a window covering, a frame disposed at the end of the support surface and a rack movable within the frame. A plurality of die assemblies are fastened to the rack, in which each die assembly includes a fixed die that has openings sized to receive the ends of the window covering and a movable die that is movable relative to the fixed die. The fixed dies and the movable dies are adapted to cut the ends of the window covering. The rack is adapted to move relative to the support surface such that a selected die assembly is adjacent the support surface and the moveable die of the selected die assembly is independently moveable of the moveable dies of the other die assemblies.

13 Claims, 17 Drawing Sheets

(56) References Cited

U.S. PATENT DOCUMENTS

| | | |
|---|---|---|
| 2,747,625 A | 5/1956 | Small |
| 2,789,639 A | 4/1957 | Lorentzen |
| 2,806,493 A | 9/1957 | Gaskell |
| 2,827,686 A | 3/1958 | Adelman |
| 2,883,736 A | 4/1959 | Crane |
| 2,949,943 A | 8/1960 | Islandsrud |
| 2,987,085 A | 6/1961 | Porter |
| 3,260,146 A | 7/1966 | Child |
| 3,263,544 A | 8/1966 | Margolien |
| 3,292,232 A | 12/1966 | Nilsson |
| 3,391,591 A | 7/1968 | Funke |
| 3,470,926 A | 10/1969 | Dohm |
| 3,513,740 A | 5/1970 | Burghart |
| 3,564,893 A | 2/1971 | Richards et al. |
| 3,584,380 A | 6/1971 | Mehler et al. |
| 3,618,297 A | 11/1971 | Hamrick |
| 3,634,975 A | 1/1972 | Hensley |
| 3,664,221 A | 5/1972 | Breetvelt |
| 3,677,117 A | 7/1972 | Cutter |
| 3,715,946 A | 2/1973 | Kaltenbach |
| 3,736,631 A | 6/1973 | Edixhoven |
| 3,750,509 A | 8/1973 | Kruse |
| 3,766,815 A | 10/1973 | Edixhoven |
| 3,854,358 A * | 12/1974 | Kruse ............................ 83/198 |
| 4,018,118 A | 4/1977 | Goff |
| 4,036,092 A | 7/1977 | Kaltenbach |
| 4,055,206 A | 10/1977 | Griffin |
| 4,067,252 A | 1/1978 | Peddinghaus et al. |
| 4,139,043 A | 2/1979 | Donofrio |
| 4,151,768 A | 5/1979 | Shockovsky |
| 4,188,693 A | 2/1980 | Edixhoven |
| 4,201,256 A | 5/1980 | Truhan |
| 4,214,493 A | 7/1980 | Elhaus |
| 4,227,902 A | 10/1980 | Olson |
| 4,230,005 A | 10/1980 | Varga |
| 4,233,782 A | 11/1980 | Perrault |
| 4,262,564 A | 4/1981 | Kaltenbach |
| 4,270,253 A | 6/1981 | Herb et al. |
| 4,326,864 A | 4/1982 | Sittler |
| 4,338,710 A | 7/1982 | Stursa et al. |
| 4,367,665 A | 1/1983 | Terpstra et al. |
| 4,407,614 A | 10/1983 | Muhr et al. |
| 4,457,197 A | 7/1984 | Wepner et al. |
| 4,468,995 A | 9/1984 | Mireles-Saldivar |
| 4,492,301 A * | 1/1985 | Inaba et al. ................ 198/346.1 |
| 4,545,100 A | 10/1985 | Gaillard et al. |
| 4,567,930 A | 2/1986 | Fischer |
| 4,576,072 A | 3/1986 | Terpstra |
| 4,606,099 A | 8/1986 | Schluep |
| 4,619,166 A | 10/1986 | Valavaara |
| 4,625,868 A | 12/1986 | Bischof |
| 4,639,987 A | 2/1987 | Georgopoulos |
| 4,721,058 A | 1/1988 | Hayamizu et al. |
| 4,726,273 A * | 2/1988 | Miceli ............................ 83/629 |
| 4,730,372 A | 3/1988 | Tsuchida |
| 4,771,667 A | 9/1988 | Forman et al. |
| 4,790,226 A | 12/1988 | Tsuchida |
| 4,807,363 A | 2/1989 | Clifton, Jr. |
| 4,819,530 A | 4/1989 | Huang |
| 4,823,449 A | 4/1989 | Chang |
| 4,876,795 A | 10/1989 | Chun-cheng |
| 4,901,419 A | 2/1990 | Voss |
| 4,907,325 A | 3/1990 | Hsu |
| 4,907,337 A | 3/1990 | Krusi |
| 4,924,740 A | 5/1990 | Wright |
| 4,928,369 A | 5/1990 | Schnebly et al. |
| 4,987,765 A | 1/1991 | Nishimura et al. |
| 4,993,131 A | 2/1991 | Graves et al. |
| D316,979 S | 5/1991 | Reynolds |
| 5,037,253 A | 8/1991 | Molaro et al. |
| 5,054,206 A | 10/1991 | Carlson |
| 5,056,388 A | 10/1991 | Dekker et al. |
| 5,060,709 A | 10/1991 | Simon |
| 5,072,494 A | 12/1991 | Graves et al. |
| 5,103,702 A | 4/1992 | Yannazzone |
| 5,119,854 A | 6/1992 | Chanoine |
| 5,215,512 A | 6/1993 | De Dompierre |
| 5,251,382 A | 10/1993 | Hellar |
| 5,339,716 A | 8/1994 | Sands et al. |
| 5,392,524 A | 2/1995 | Hill |
| 5,456,149 A | 10/1995 | Elsenheimer et al. |
| 5,667,152 A | 9/1997 | Mooring |
| 5,740,053 A | 4/1998 | Iwama |
| 5,787,774 A | 8/1998 | Richards et al. |
| 5,799,557 A | 9/1998 | Wang |
| 5,806,245 A * | 9/1998 | Satrom ............................ 49/360 |
| 5,806,394 A | 9/1998 | Marocco |
| 5,816,126 A | 10/1998 | Pluber |
| 5,819,619 A | 10/1998 | Miller et al. |
| 5,826,317 A | 10/1998 | van Oostrom et al. |
| 5,882,155 A | 3/1999 | Testa |
| 5,927,172 A | 7/1999 | Wang |
| 5,943,932 A | 8/1999 | Sberveglieri |
| 5,971,839 A | 10/1999 | Schmelzer |
| 6,003,217 A | 12/1999 | Graves et al. |
| 6,003,218 A | 12/1999 | Schumann et al. |
| 6,079,306 A | 6/2000 | Liu |
| 6,089,134 A | 7/2000 | Marocco |
| 6,142,196 A | 11/2000 | Schumann et al. |
| 6,167,789 B1 | 1/2001 | Daniels et al. |
| 6,178,857 B1 | 1/2001 | Marocco |
| 6,202,014 B1 | 3/2001 | Brandt et al. |
| 6,334,379 B1 | 1/2002 | Sudano |
| 6,336,388 B1 | 1/2002 | Marocco |
| 6,362,893 B1 | 3/2002 | Francis et al. |
| 6,405,406 B1 | 6/2002 | Chen |
| 6,412,381 B1 | 7/2002 | Wang et al. |
| 6,418,762 B1 | 7/2002 | Munch et al. |
| 6,427,571 B1 | 8/2002 | Hsu |
| 6,500,048 B1 | 12/2002 | Bar |
| 6,535,294 B1 | 3/2003 | Arledge, Jr. et al. |
| 6,561,121 B1 | 5/2003 | Rose |
| 6,604,443 B2 | 8/2003 | Roberts et al. |
| 6,615,698 B2 | 9/2003 | Chuang et al. |
| 6,783,563 B1 | 8/2004 | Eckhoff |
| 2002/0117039 A1 | 8/2002 | Huang |
| 2002/0178884 A1 | 12/2002 | Chuang et al. |
| 2003/0033919 A1 | 2/2003 | Lin |
| 2003/0066403 A1* | 4/2003 | Lin et al. ........................ 83/412 |
| 2003/0110913 A1 | 6/2003 | Chen |
| 2003/0140756 A1 | 7/2003 | Lin |

FOREIGN PATENT DOCUMENTS

| | | |
|---|---|---|
| CN | 250743 | 7/1995 |
| CN | 269841 | 2/1996 |
| DE | 857 677 C | 12/1952 |
| DE | 223 048 C | 6/2010 |
| EP | 0 265 564 | 5/1988 |
| EP | 0 273 535 | 7/1988 |
| EP | 0 629 475 A1 | 6/1994 |
| GB | 1 213 388 A | 11/1970 |
| GB | 2 258 686 A | 2/1993 |
| WO | WO 01/07747 | 2/2001 |
| WO | WO03/010408 | 2/2003 |

* cited by examiner

MODULAR BLIND CUTTING CENTER

CROSS REFERENCE TO RELATED APPLICATIONS

This application is a continuation-in-part of and claims priority to U.S. Ser. No. 09/911,292, filed on Jul. 23, 2001, now U.S. Pat. No. 6,604,443, the disclosure of which is hereby incorporated by reference.

TECHNICAL FIELD

The patent is generally related to Venetian blind cutting centers, and more particularly to a Venetian blind cutting center with a plurality of selectable cutting dies.

BACKGROUND

Mass retail merchandisers sell a large number of window coverings directly to consumers. Standard sized window coverings can be sized to a consumer's specifications while the consumer waits. The apparatus employed to size the various window coverings should be easy to use by an employee of a retail outlet and should not require an extensive training period.

Additionally, the floor space that the cutting apparatus requires should fit within the existing structure and layout of the retail outlet. Further, the cutting apparatus ideally should size a number of different types of window coverings, such as metal or vinyl mini-blinds, vertical blinds, pleated shades, and cellular shades.

The sale of vertical blind products has also increased through mass merchandiser retail outlets, requiring the ability to size not only the width of the vertical blind head rail but also the length of the vertical blind slats. However, if a cutting apparatus is to be located within an 8-foot bay environment, any vertical blind slat extending greater than 8 feet would not be able to be sized with an apparatus located within the 8-foot bay. Accordingly, there is a need for a vertical blind cutting apparatus that would fit within the 8-foot bay environment as well as be able to size vertical blind slat product having a length greater than 8 feet.

Accordingly, there is a need for a modular blind cutting station that can size a variety of window covering products at the point of purchase.

Figure 1:
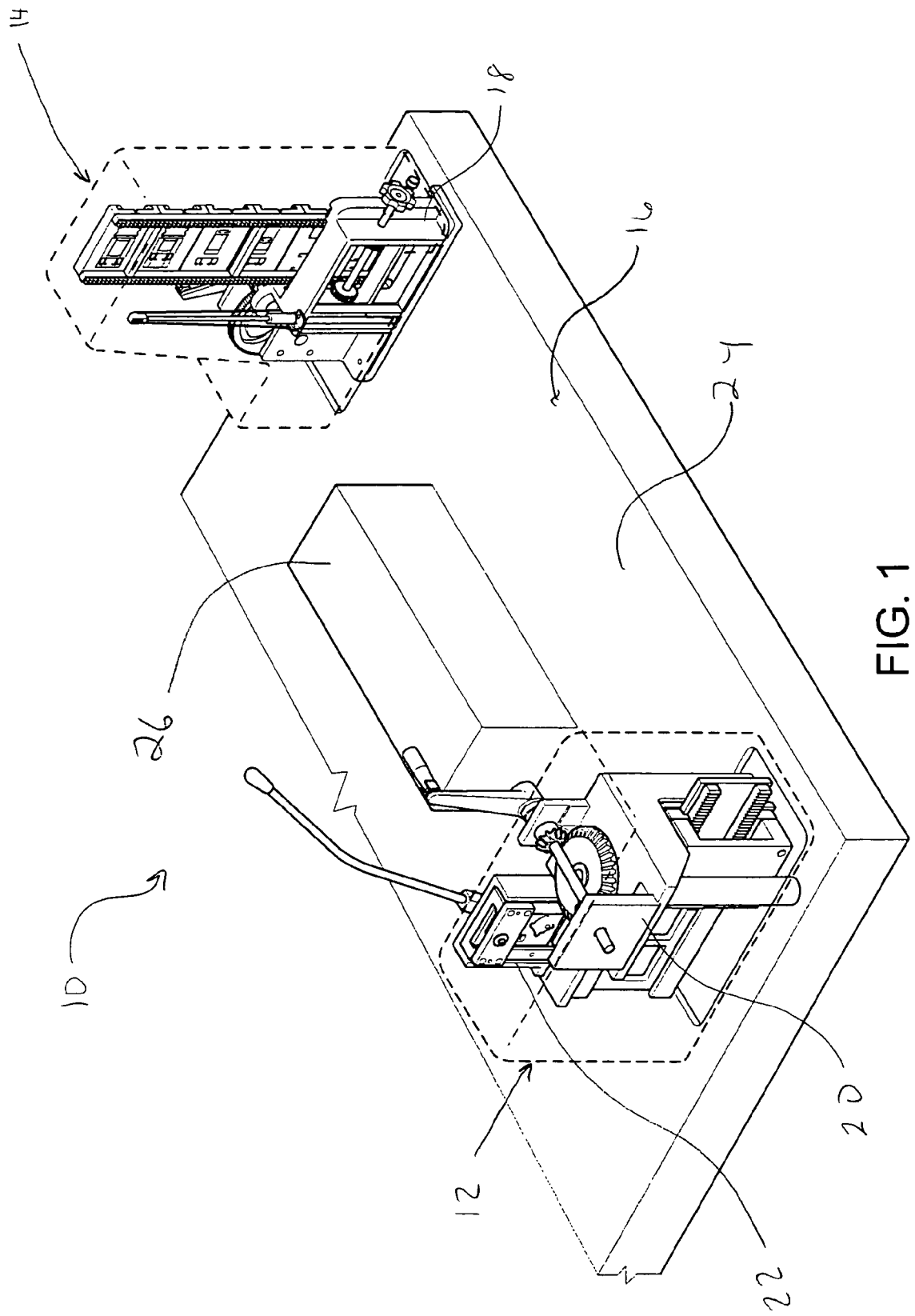
FIG. 1 is a perspective view of a modular blind cutting center in accordance with the teachings of this disclosure.
Figure 2:
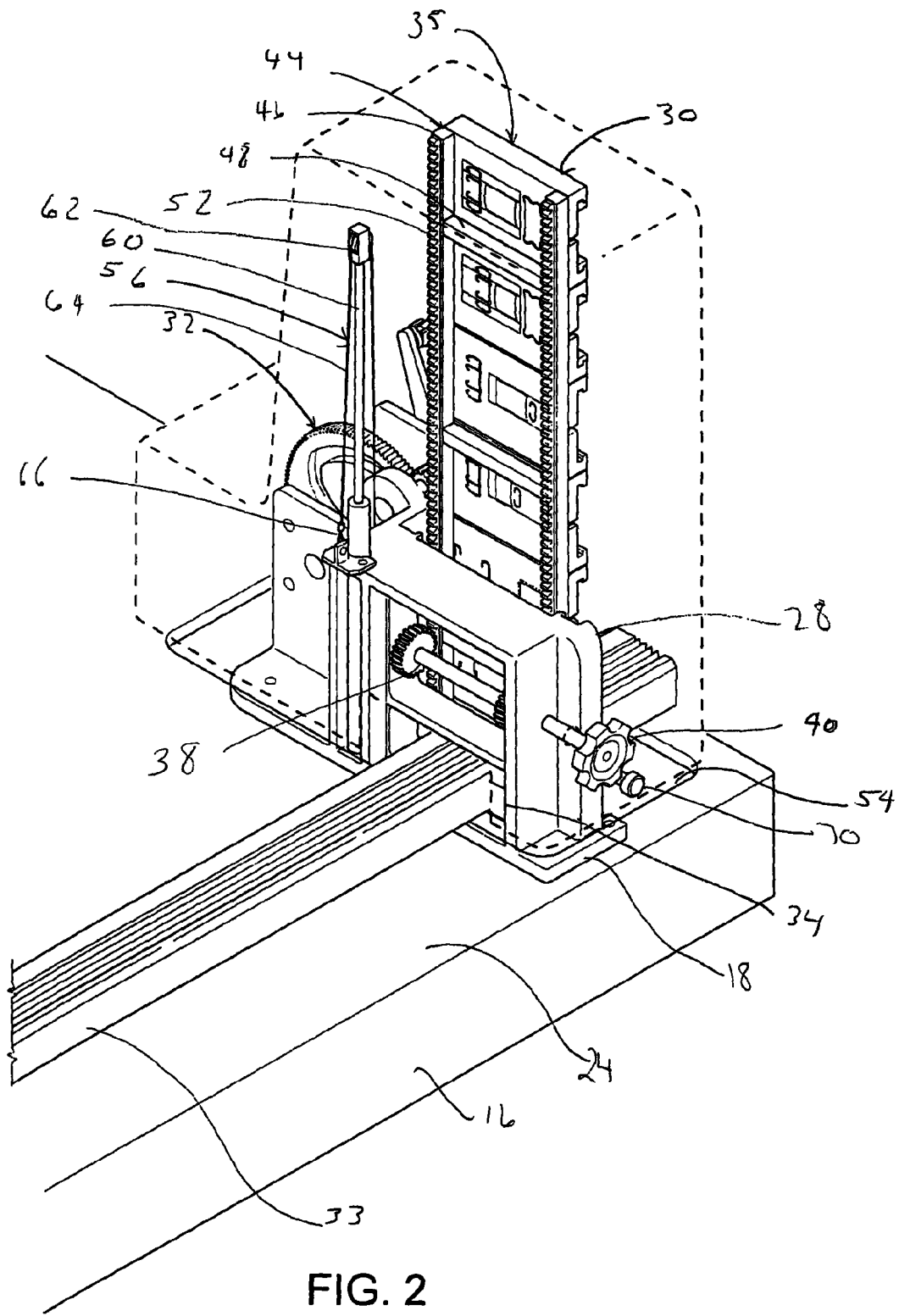
FIG. 2 is a perspective view of the first cutting station of the modular blind cutting center of FIG. 1 with a blind inserted and ready to be sized.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and the equivalents falling within the spirit and scope of the invention as defined by the appended claims.

DETAILED DESCRIPTION

Referring now to the drawings, and particularly to FIG. 1, a blind cutting center 10 includes a left end 12, a right end 14, and a support table 16 disposed between the two ends 12, 14. The right end 14 includes a first cutting station 18. The left end 12 includes a second cutting station 20 and a third cutting station 22. The first cutting station 18 is configured to cut the ends of a multiplicity of styles of horizontal mini-blinds. The second cutting station 20 is adapted to cut the ends of vertical blinds and faux wood blinds. Finally, the third cutting station 22 is adapted to cut the length of a vertical blind head rail. While references may be made to the cutting center 10 with left, right, upper, lower, etc., these terms are used for the reader's understanding of the drawings only, and no limitations should be read therein.

The support table 16 includes a first support surface 24 and a second support surface 26 disposed at a higher elevation than the first support surface 24. The first support surface 24 is adapted to provide support for horizontal blinds being sized at the first cutting station 18 and for vertical blinds or faux wood blinds being sized at the second cutting station 20. The second support surface 26 is adapted to provide support for a vertical blind head rail being sized at the third cutting station 22.

The first support surface 24 and the second support surface 26 can include a plurality of measuring scales (not shown) that indicate the distance from the cutting plane of the first, second and third cutting stations 18, 20, 22, as shown in the incorporated application, U.S. Ser. No. 09/911,292.

Turning now to FIGS. 2-6 the first cutting station 18 includes a frame 28 that supports a rack system 30, a drive system 32, and defines an opening 34. The opening 34 is dimensioned to receive the ends of a window covering 33 that is to be sized. The rack system 30 includes a plurality of die assemblies 35 and is movable in the vertical direction such that a selected die assembly 35' is aligned with the opening 34. The die assemblies 35 are adapted to receive the ends of the window coverings that have been inserted through the opening 34 and cut the ends to predetermined lengths. The drive system 32 can engage the selected die assembly 35' and provide the force to cut the ends of the window coverings.

The rack system 30 includes a pinion shaft 38 extending through and rotatable within the frame 28. On the outside end of the pinion shaft 38 is a handle 40 that can be grasped by the user and used to turn the pinion shaft 38. Disposed along the pinion shaft 38 are a pair of pinion gears 42. Although two pinion gears 42 are shown, it may be determined that more or less are desirable based on the width of the rack system 30.

The rack system 30 also includes a rack 44 that is defined by a pair of upright bars 46 that are connected together by a series of cross-members 48. The rack 44 is maintained within the frame by a pair of channels 50 (See FIGS. 4 and 5). Disposed along the length of each upright bar 46 is a rack gear 52. The rack gear 52 is adapted to engage the pinion gears 42 such that when a user rotates the handle 40, the pinion gears 42 rotate, thereby raising or lowering the rack 44, depending on the direction of rotation of the handle 40. In this manner, one of the plurality of die assemblies 35 can be selected and placed in alignment with the opening 34 of the frame 28 to receive the ends of the window covering to be sized. In this example, the support table 16 includes a passage 54 to allow the rack 44 to descend. In other examples, the first cutting station 18 can be placed on a support separate from the support table 16 to allow the rack 44 to fully descend.

Figure 3:
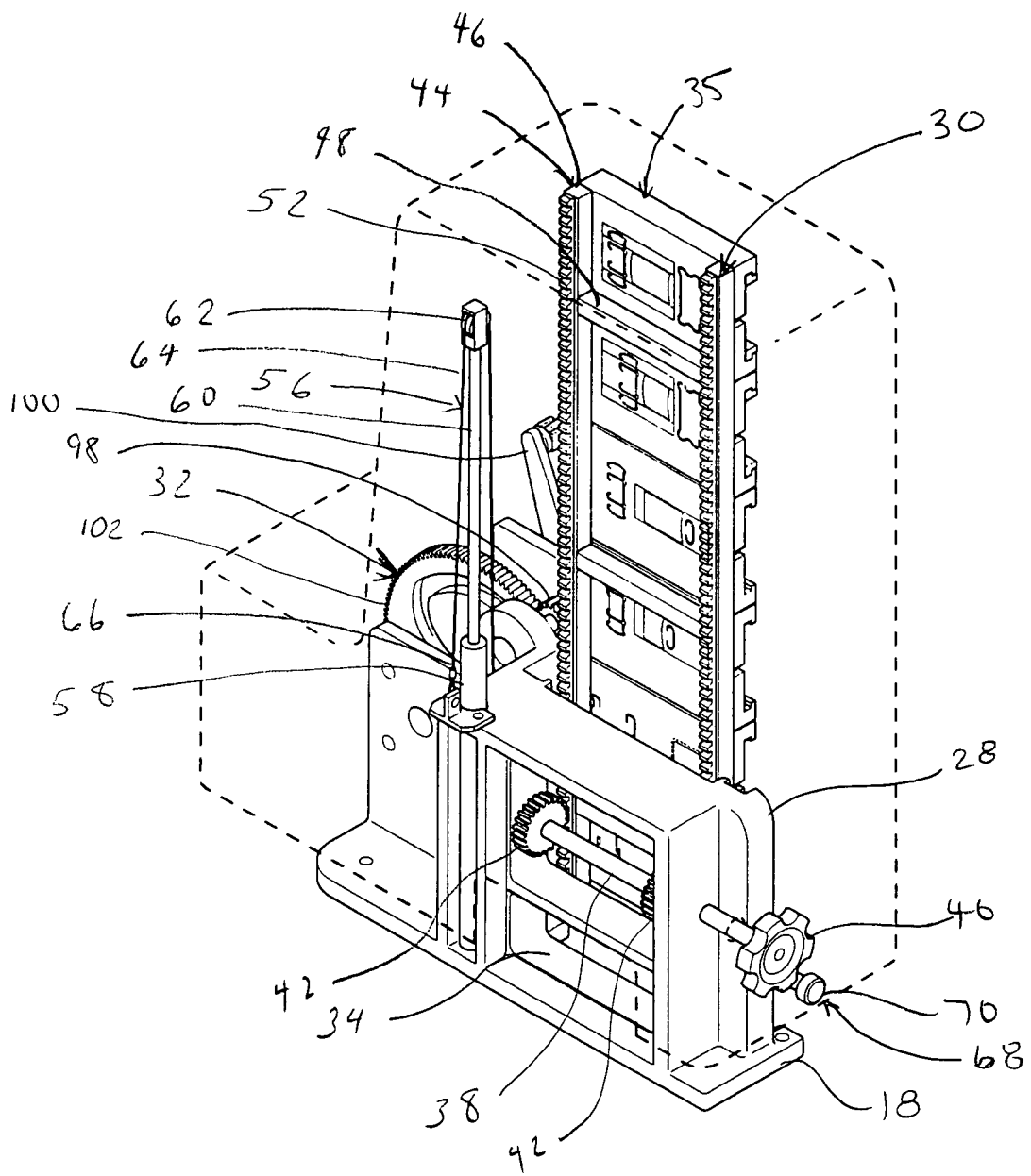
FIG. 3. is a perspective view of the first cutting station, with the support table and blind removed.
Figure 4:
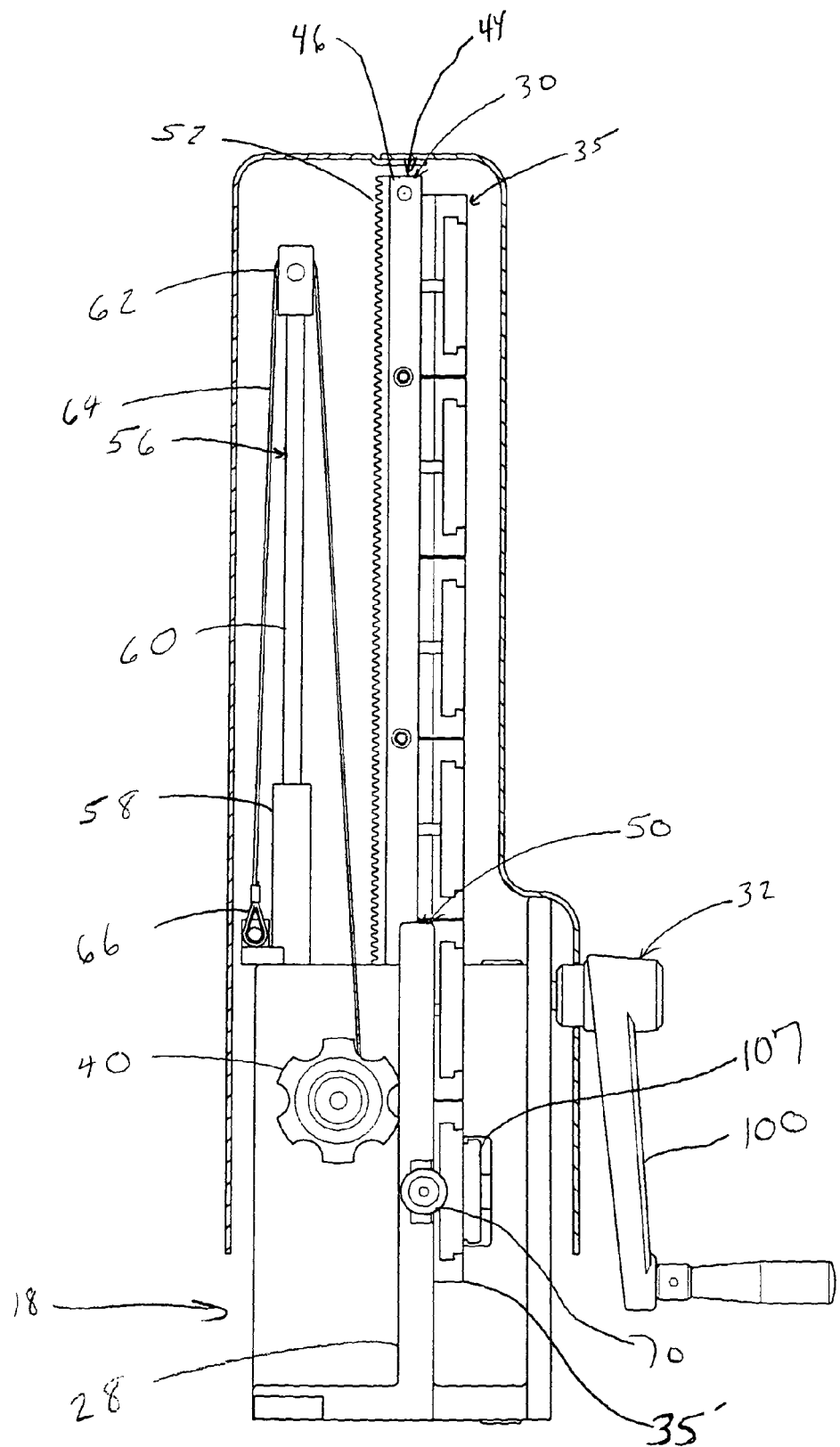
FIG. 4 is an elevational view of the first cutting station.

A lift-assist system 56, best seen in FIGS. 3 and 4 is affixed to the frame 28 to assist in the raising and lowering of the rack 44. The lift-assist system 56 includes a gas cylinder 58 with a shaft 60 extending upward. A pulley 62 is disposed on the end of the shaft 60. A cable 64 is attached to the frame 28 at its first end 66. The cable 64 travels through the pulley 62, and is wrapped around the pinion shaft 38 on its other end. Thus, as the pinion shaft 38 is rotated to raise the rack 44, the gas cylinder 58 urges the pulley 62 upward, pushing the cable 64 upward and unwinding the cable 64 about the pinion shaft 38, thereby aiding the user in raising the rack 44.

Figure 5:
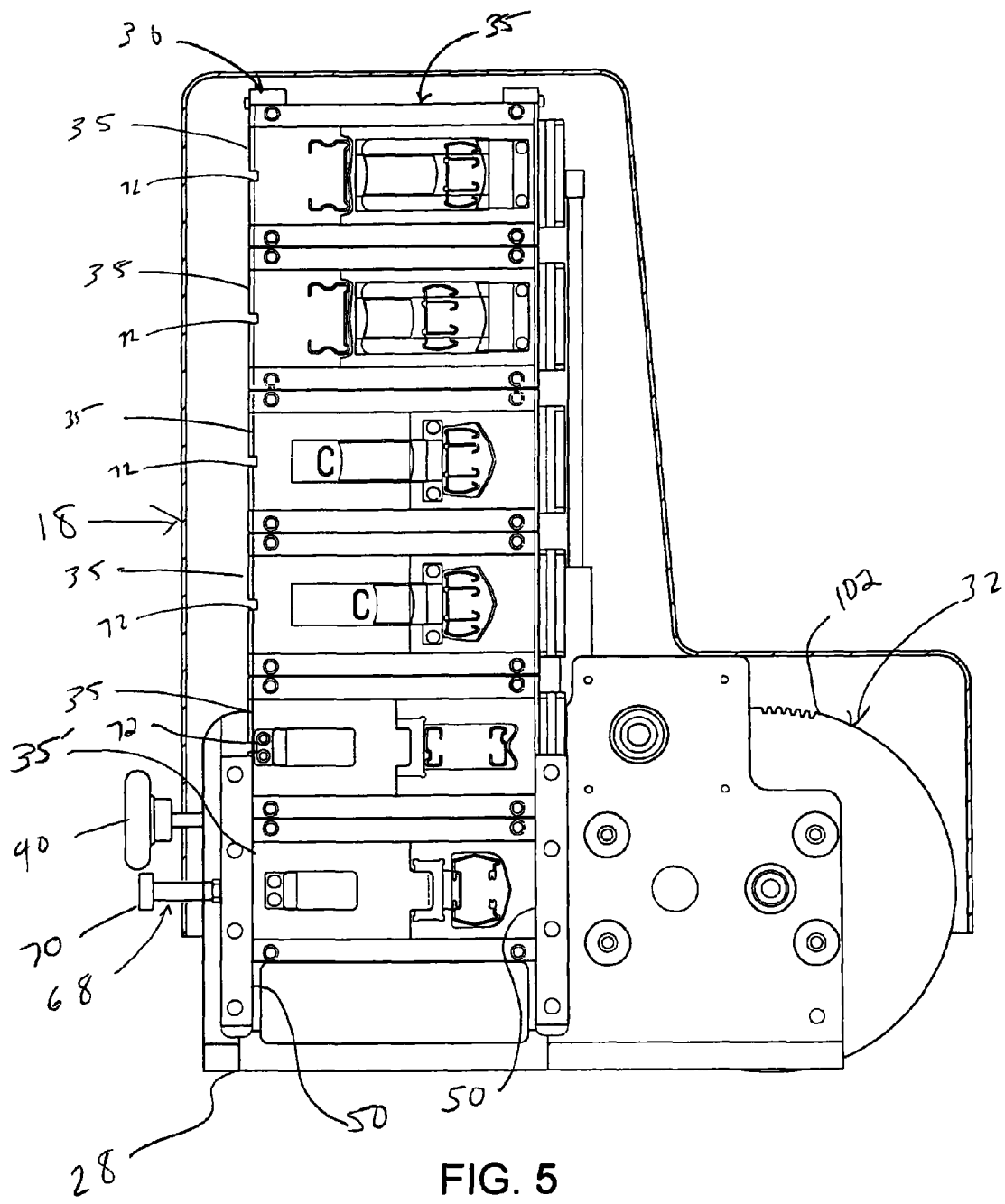
FIG. 5 is a side view of the first cutting station.
Figure 6:
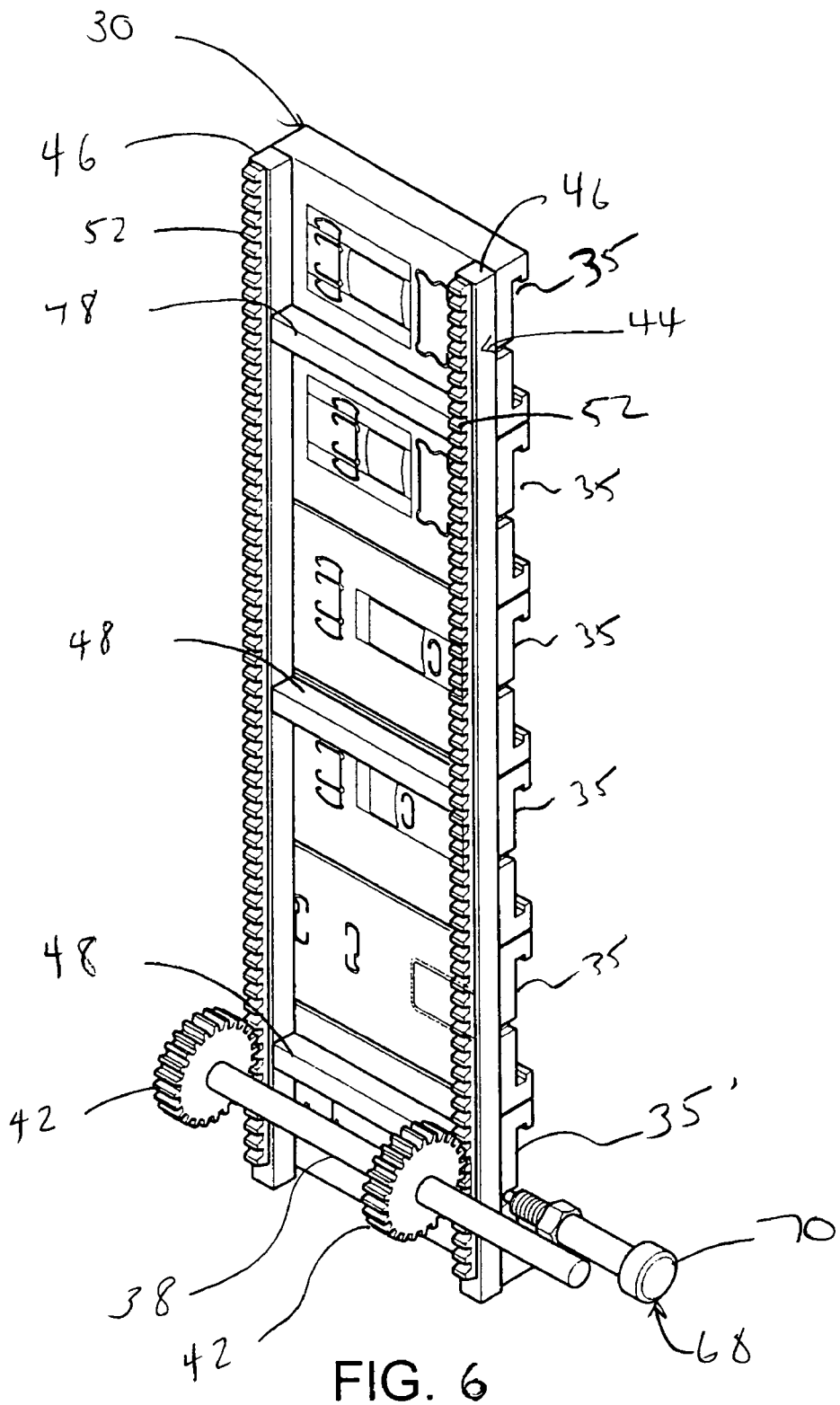
FIG. 6 is a detail perspective view of the movable rack assembly

The first cutting station 18 also includes a die locator system 68, best seen in FIGS. 3 and 5. The die locator system 68 ensures that the selected die assembly 35' is maintained in alignment with the opening 34 in the frame. To this end, a spring-loaded retractable pin 70 is disposed in the frame 28. Each die assembly 35 includes a receiver 72 sized to receive the pin 70 such that when a selected die assembly 35' is placed into alignment with the opening 34 in the frame 28, the pin 70 extends into the receiver 72, urged by the spring force, thereby positively locating and locking the die assembly 35' in place. When the user desires to select a different die assembly 35, the user simply pulls the pin 70 out of the receiver 72 and turns the handle 40.

Figure 7:
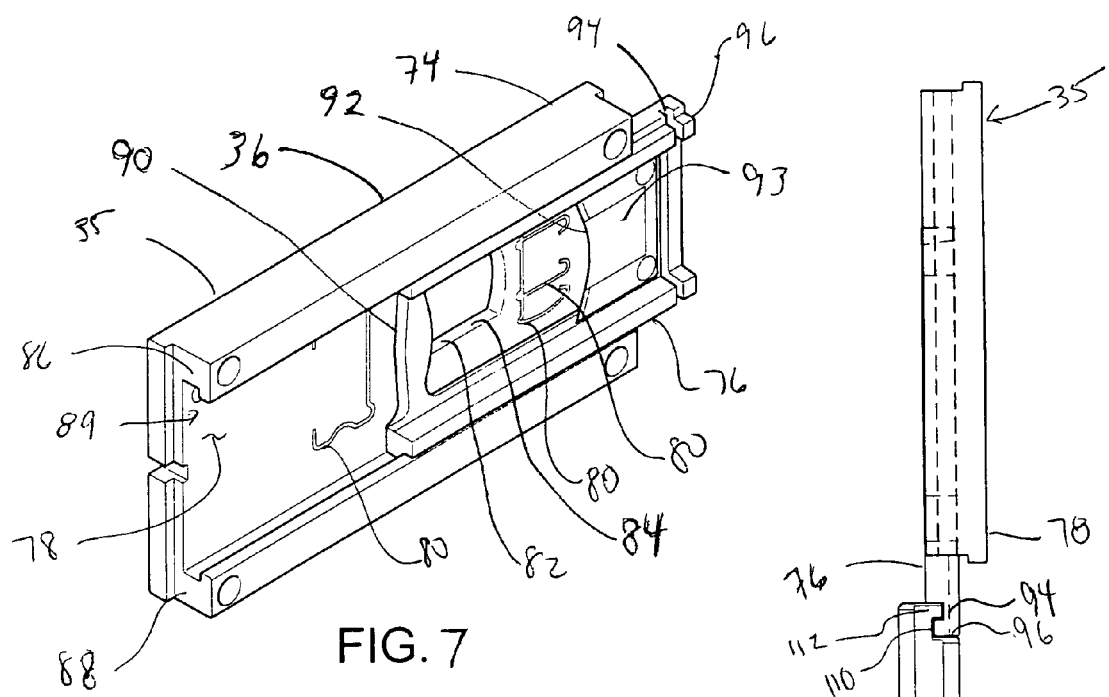
FIG. 7 is a perspective view of a first die assembly mounted to the rack assembly.

The die assemblies 35 each include a fixed die 74 and a movable die 76, seen best in FIG. 7. Each fixed die 74 is fastened to either the upright bars 46 or the cross members 48 of the rack 44 or both and includes a receiving surface 78 that has openings sized for the ends of window coverings. The openings can include a head rail opening 80, a blind slat opening 82, and a bottom rail opening 84. In the example shown in FIG. 7, an example of a die assembly 36 includes openings that are configured to size a cordless window covering with vinyl slats. The receiving surface 78 includes three head rail openings 80 for three different styles of window coverings, and a combined blind slat and bottom rail opening 82, 84.

The fixed dies 74 each include an upper bracket 86 and a lower bracket 88 that define channels 89. The movable dies 76 slide within these channels 89 and include at least a first cutting surface 90. Each movable die 76 may also include a second cutting surface 92. In the example of FIG. 7, the movable die 76 has a first cutting surface 90 and a second cutting surface 92 defined by a blade 93 attached to the movable die 76. The movable die 76 is adapted to shear off a desired portion of the window covering fitted through the openings 80, 82, 84 in the receiving surface 78.

Figure 8A:
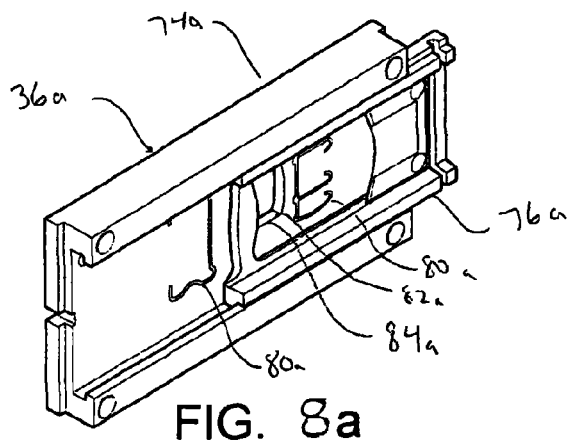
FIGS. 8a-8e are perspective views of further examples of die assemblies.

In this example, a total of six die assemblies 36, 36a-36e are fastened to the rack, however, the total could easily be more or less. Each of the die assemblies 36, 36a-36e are adapted to size a different style of window coverings. Referring to FIG. 8a, the die assembly 36a is adapted to size a cordless metal blind. It includes openings 80a, 82a, 84a similar to the receiving area of FIG. 7, however, the blind slat opening 82a is smaller due to the thinner slats of a metal blind. The die assembly 36b of FIG. 8b is adapted to size a corded window covering with vinyl slats. It includes a pair of head rail openings 80b, a slat opening 82b, and a bottom rail opening 84b. The movable die 76b includes a first cutting surface 90b adapted to cut the head rail, and further includes a second cutting surface 92b adapted to cut the slats and the bottom rail. The first cutting surface 90b is substantially thicker to cut through the metal head rail. FIG. 8c depicts a die assembly 36c for cutting a corded metal window covering. It is similar to the die assembly 36b of FIG. 8b, but again has a smaller opening 82c for the blind slats, due to the metal slats being thinner than the vinyl slats.

Figure 8D:
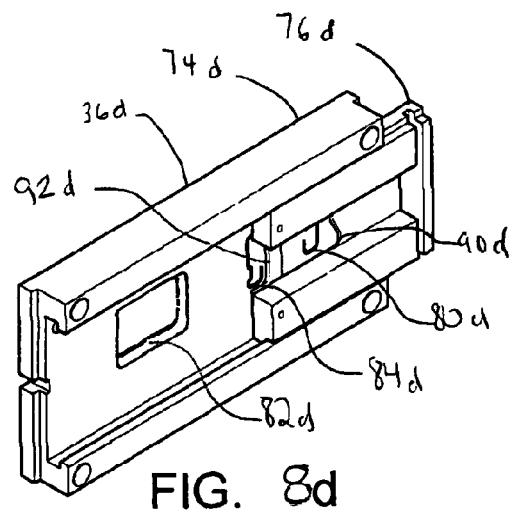
Figure 8B:
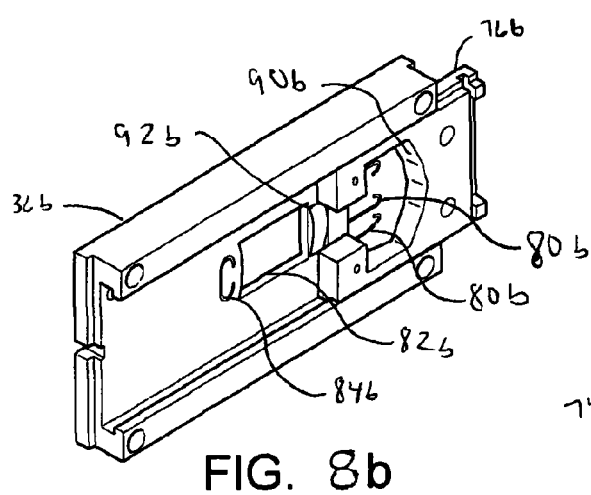
Figure 8E:
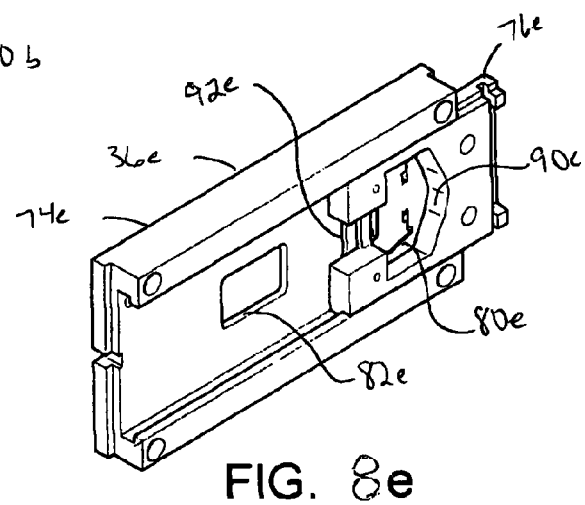
Figure 8C:
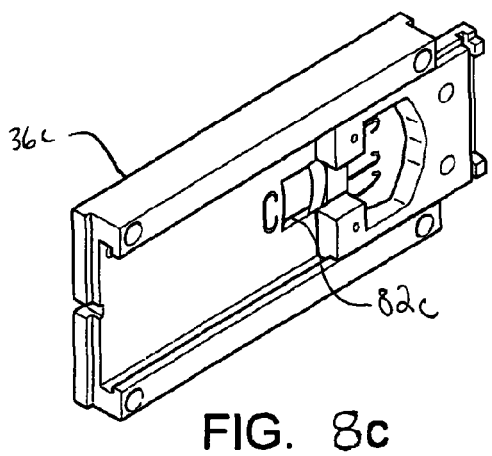

FIG. 8d depicts a die assembly 36d adapted to size a corded cellular or pleated blind. The fixed die 74d includes first and second openings 80d, 84d adapted to receive the head rail and the bottom rail. It further includes a third opening 82d for receiving the cellular or pleated material. The movable die 76d includes a first cutting surface 90d for cutting the head rail and a second cutting surface 92d for cutting the bottom rail and cellular material. Finally, FIG. 8e depicts a die assembly 36e adapted to size a cordless cellular or pleated blind. The fixed die 74e includes a first opening 80e for receiving a head rail and a second opening 82e for receiving the bottom rail and the cellular material. The movable die 76e again includes a first cutting surface 90e and a second cutting surface 92e.

Referring back to FIG. 7, each movable die 76 further includes a notch 94 and a lug 96 extending across its height on the side opposite the cutting surfaces 90, 92. As will be described in further detail, the drive system 32 engages the lug and notch 94, 96 to apply force to the movable die 76 so that it slides through the channels 89 to cut off the ends of the window covering in the fixed die 74.

Figure 9:
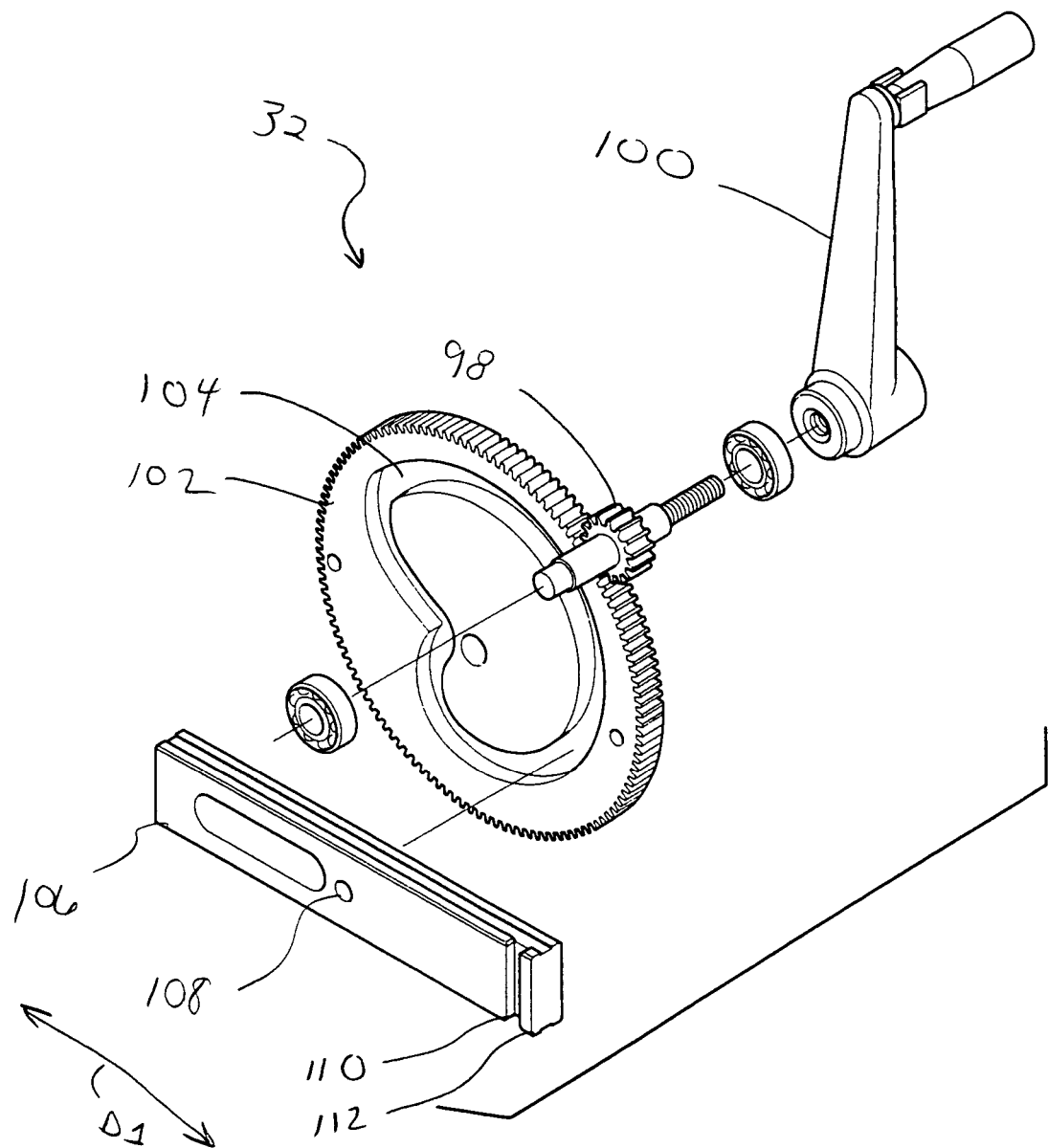
FIG. 9 is an exploded perspective view of the drive assembly.

As seen in FIGS. 3 and 9, the drive system 32 includes a relatively small gear 98 rotatably disposed in the frame 28. A crank handle 100 is fixedly attached to the small gear 98. A relatively large gear 102 is also rotatably disposed in the frame 28 and engaged with the small gear 98, such that the rotation of the crank handle 100 rotates the small gear 98 and therefore the large gear 102, with a gain in force proportionate to the ratio of the large gear 102 to the small gear 98. The large gear 102 includes a cam slot 104 formed in its side.

Figure 10:
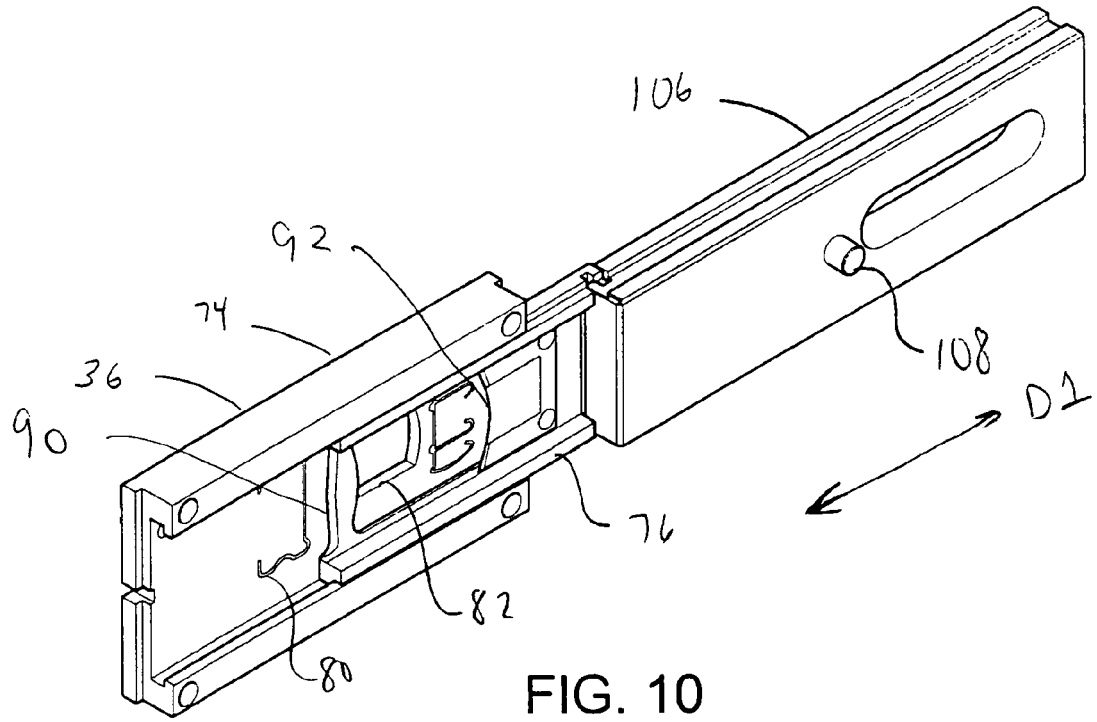
FIG. 10 is a perspective view of the pushrod and first die assembly in a first position ready to receive the ends of a window covering.

The drive system 32 also includes a ram 106 with a pin 108 extending out from the ram 106, as seen in FIGS. 9 and 10.

The ram 106 is constrained to slide in a direction D1 along its length in a channel 107 in the frame (FIG. 4). The pin 108 is adapted to fit into the cam slot 104 of the large gear 102. Accordingly, as the crank handle 100 is rotated, and the large gear 102 is rotated, the cam slot 104 pushes the pin 108 and therefore the entire ram 106 through the channel 107 in the direction D1.

Figure 12:
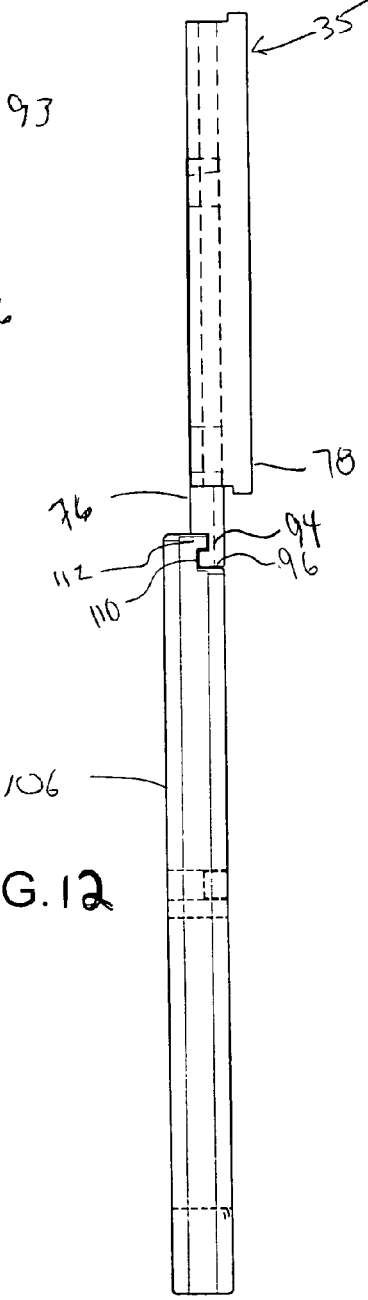
FIG. 12 is a top view of the ram of the drive assembly and a die assembly.
Figure 11:
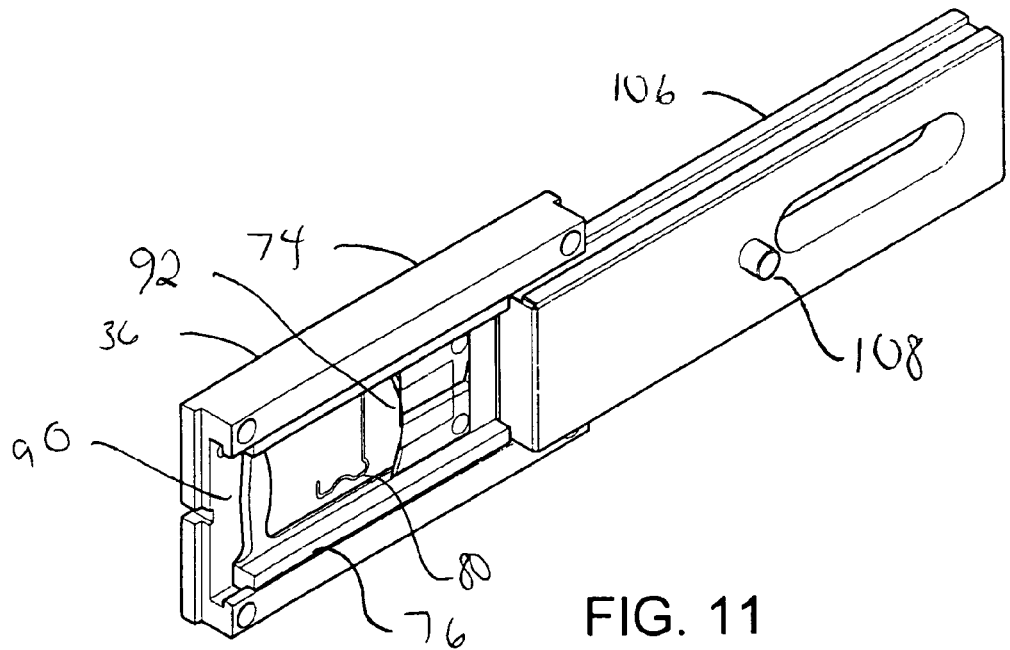
FIG. 11 is a perspective view of the pushrod and the first die assembly in a second position after cutting the ends of a window covering.

The ram 106 includes a notch 110 and a lug 112 on its end. As can be seen in FIGS. 10-12, the ram notch 110 is adapted to engage the movable die lug 96, and the ram lug 112 is adapted to engage the movable die notch 94 such that as the ram 106 moves back and forth in direction D1, a cutting force is imparted on the movable die 76 such that it is moved back and forth relative to the fixed die 74 to shear the ends of the window covering.

The notches 94 and the lugs 96 of each of the movable dies 76 are aligned with each other vertically. As such, as the rack 44 is moved vertically up or down, the notch 110 and lug 112 of the ram 106 slides within the notches 94 and lugs 96 of the movable dies 76 as they pass by the opening 34 in the frame 28. The notch 110 and lug 112 of the ram 106 are always engaged with the notch 94 and lug 96 of the selected movable die 76, while the unselected movable dies 76 are not engaged. Thus, only the movable die 76 of the selected die assembly 36 is moved by the ram 106.

To use the first cutting station 18, a user selects a window covering larger than the window he or she would like to cover. The pin 70 is retracted, and the handle 40 is turned to raise or lower the rack 44 by the rack and pinion gears 42, 52 such that the selected die assembly 36 is aligned with the opening 34 in the frame 28. The notch 110 and lug 112 of the ram 106 slides through the notches 94 and lugs 96 of the die assemblies 35 as the rack 44 is raised or lowered. Once the selected die assembly 35' is aligned with the opening 34, the pin 70 is inserted into the receiver 72 of the die assembly 35'. Using the scales, the window covering is then inserted though the openings 80, 82, 84 on the receiving surface 78 of the fixed die 74 to a point where the desired amount will be sheared from the ends. The crank handle 100 is then rotated, thereby rotating the small gear 98 and the large gear 102. The ram 106 is forced along direction D1 by the pin 108 placed inside the cam slot 104. The ram 106 engages the movable die 76, moving the movable die 76 in the direction D1 relative to the fixed die 78, to shear the ends of the window covering with the first cutting surface 90 and the second cutting surface 92. The process can then be repeated for the other side of the window covering.

In other examples, the rack system 30 is not required to move vertically. It could rotate on a disk or on a drum, although this method would require more space.

As seen in FIGS. 1 and 13-16, the left end 12 includes a frame 114 supporting the second cutting station 20 and the third cutting station 22. The second cutting station 20 includes a drive system 116 driving a die assembly 118 that are both fixed to the frame 114.

Figure 14:
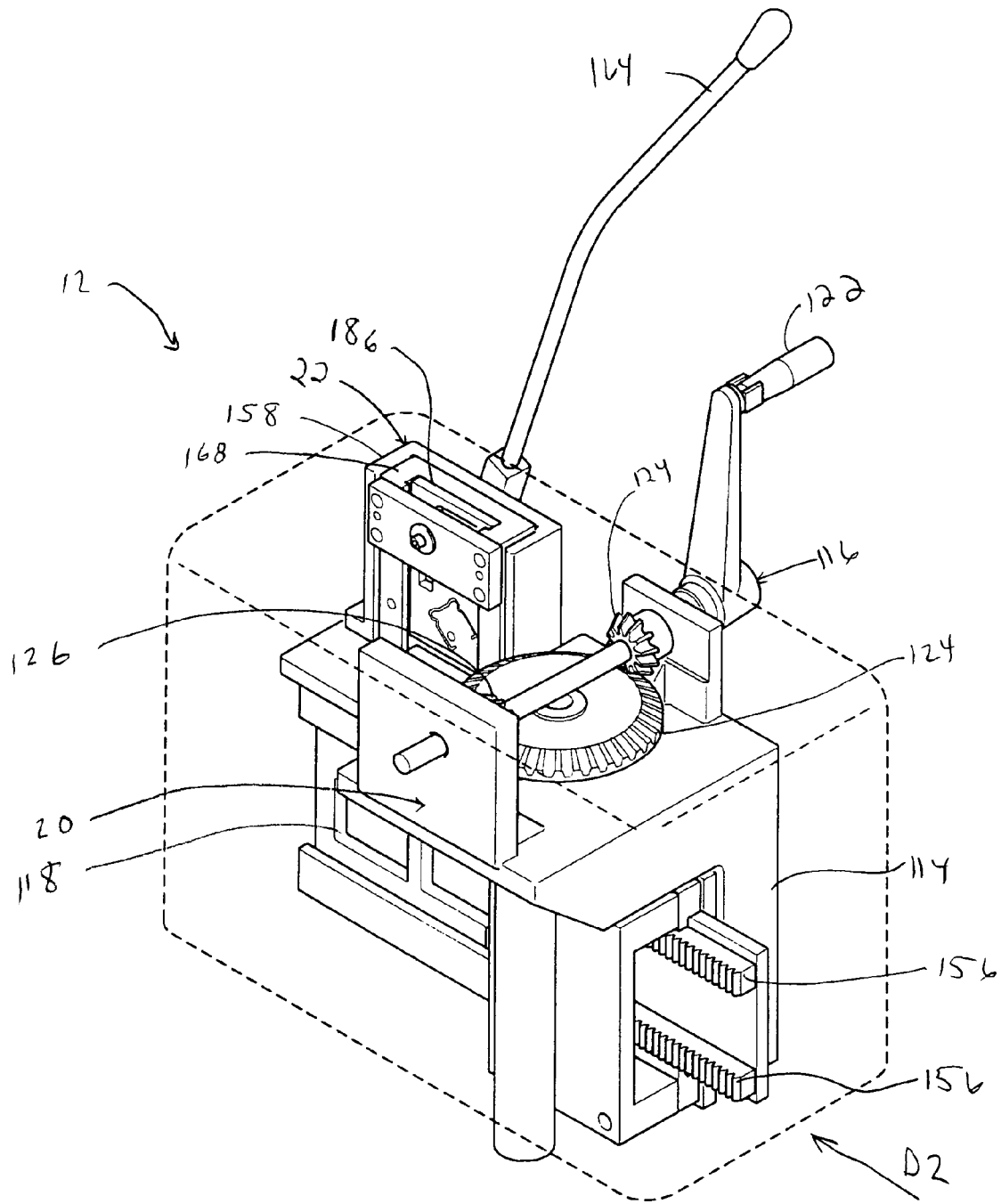
FIG. 14 is a perspective view of the second cutting station with the table and blind removed.
Figure 17:
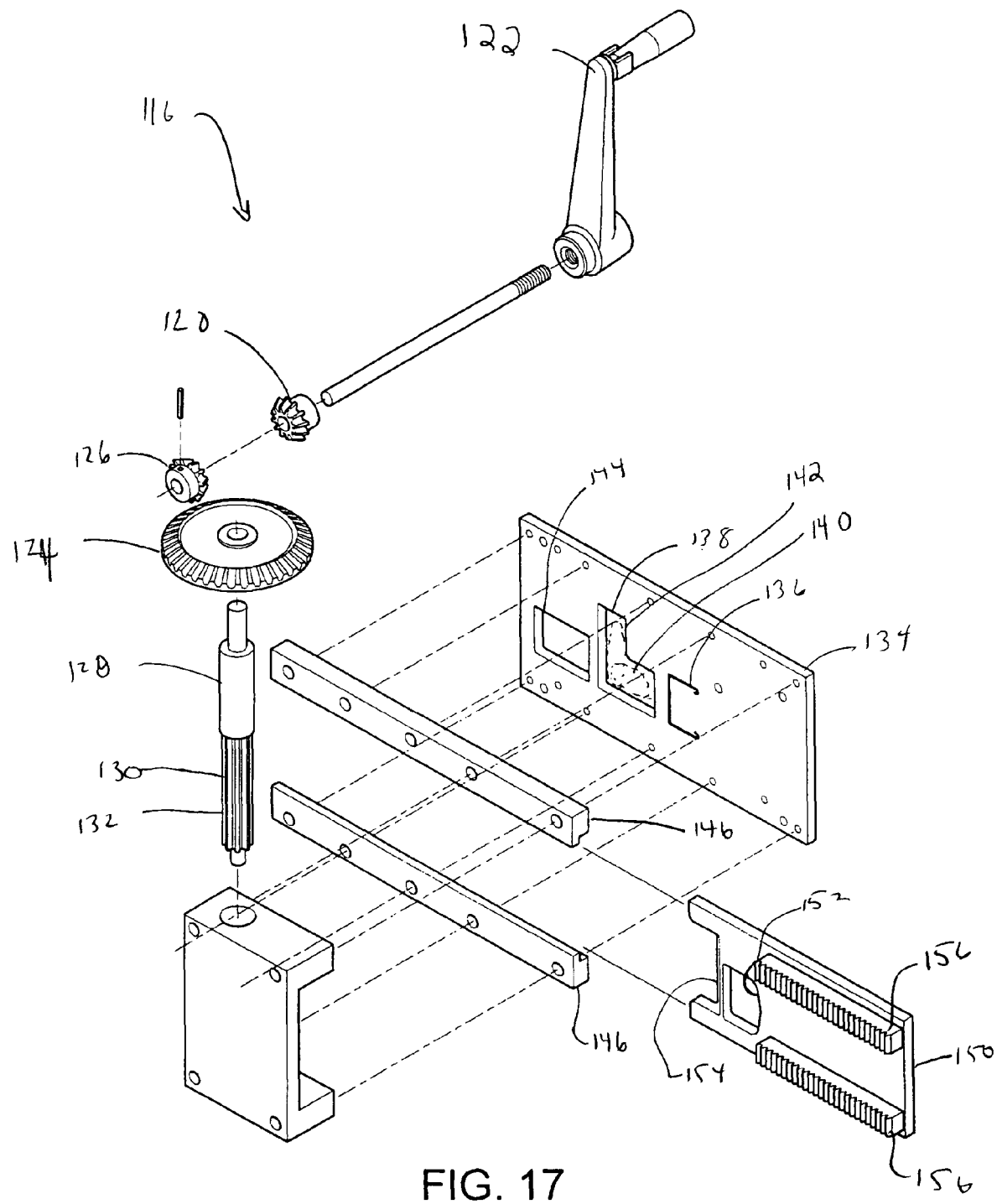
FIG. 17 is an exploded perspective view of the faux wood cutting apparatus, with the frame removed.

Referring particularly to FIGS. 14 and 17, the drive system 116 includes a relatively small drive gear 120 that is beveled at a 45° angle and rotatably fixed to the frame 114. A crank handle 122 is attached to the drive gear 120. A relatively large gear 124, also beveled at 45°, is driven by the drive gear 120 and is also rotatably fixed to the frame 114. A passive beveled gear 126 also engages the large gear 124 to help distribute the forces of the large gear 124 and the driving gear 120. Extending down from the large gear 124 is a shaft 128. Cut into the shaft 128 are teeth 130, thereby creating a pinion gear 132 within the shaft 128. Although in this example the gear 132 is cut into the shaft 128, it is clear that other forms of gears could be used.

Fastened to the frame 114 is a fixed die 134. The fixed die 134 includes a plurality of openings disposed at an elevation similar to the plane of the first support surface 24, seen in elevation view in FIG. 15. A first opening 136 is adapted to receive a head rail of a window covering with faux wood slats. A second opening 138 is approximately "L" shaped and is adapted to receive the window coverings of either a blind with faux wood slats 139, or the slats of a vertical window covering. The second opening 138 includes a first region 140 that is relatively wide for receiving the wide slats of a vertical blind, and includes a second region 142 for receiving the comparatively narrow slats of a horizontal blind. A third opening 144 can receive the bottom rail.

Referring back to FIGS. 14 and 17, fastened to the fixed die 134 are a pair of brackets 146 that define a channel 148 therebetween. A movable die 150 slides within the channel 148 and against the fixed die 134. The movable die 150 includes a first cutting surface 152 adapted to cut the head rail and a second cutting surface 154 adapted to cut the slats and bottom rail.

The movable die 150 includes a pair of rack gears 156 disposed thereon. The rack gears 156 are engaged by the pinion gear 132 such that as the pinion gear 132 rotates, the rack gears 156 drive the movable die 150 in the direction D2.

To use the second cutting station 20, a user inserts the head rail, slats, and bottom rail of a faux wood blind through the first opening 136, the second region 142 of the second opening 138, and the third opening 144 in the fixed die 134. In another use, the user can insert the blinds from a vertical window covering through the first region 140 of the second opening 138. Like the first cutting station 18, a scale can be disposed on the support surface 24 to help measure the length to be cut off. The crank handle 122 is then rotated, thereby rotating the drive gear 120, the large gear 124, and the pinion gear 132. The pinion gear 132 drives the rack gears 156 and the movable die 150 in the direction D2. The first cutting surface 152 and the second cutting surface 154 then engage the window covering and shear off the end portions.

Figure 13:
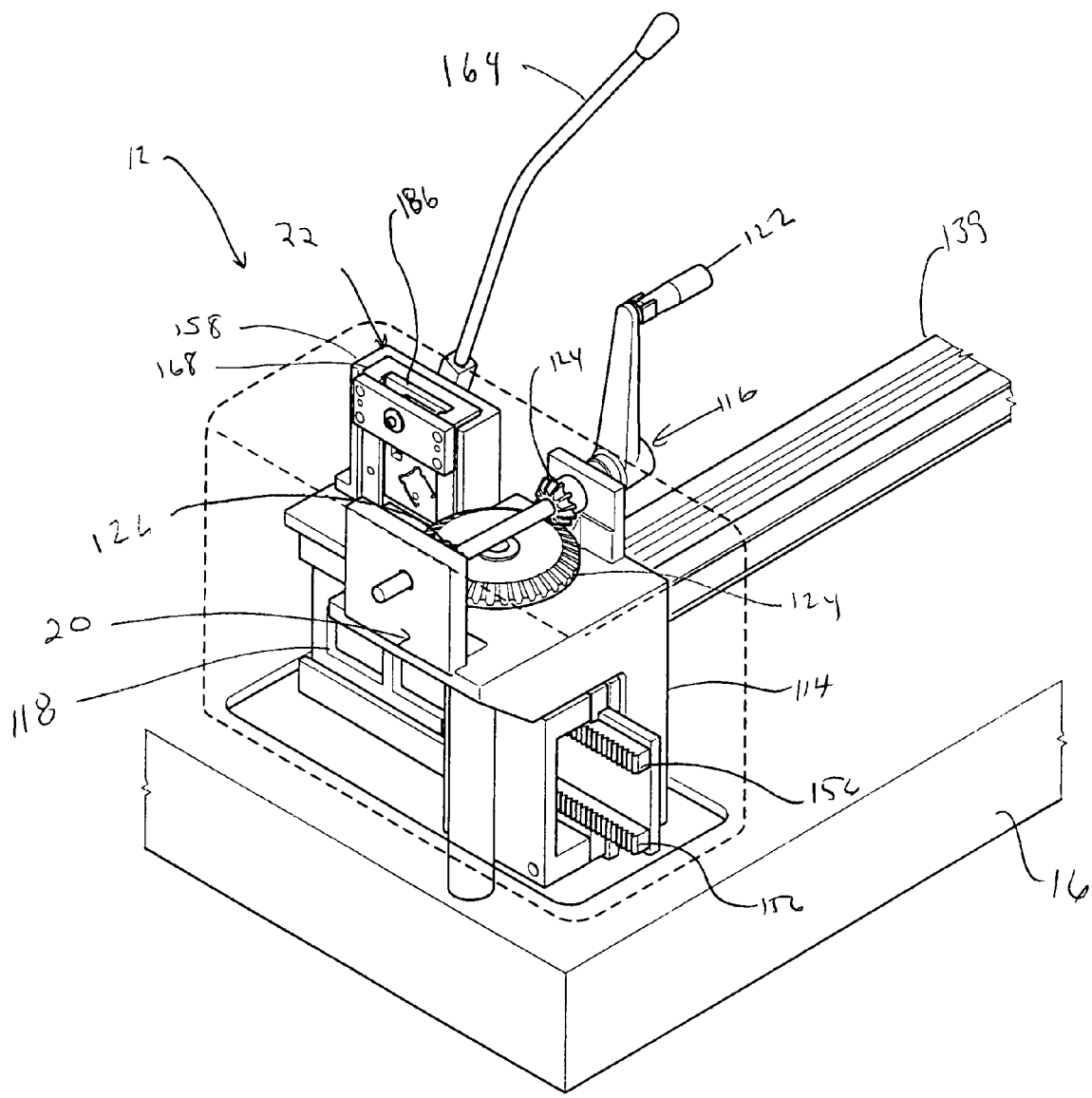
FIG. 13 is a perspective view of the second cutting station of the modular blind cutting center of FIG. 1, with a blind inserted and ready to be sized.
Figure 18:
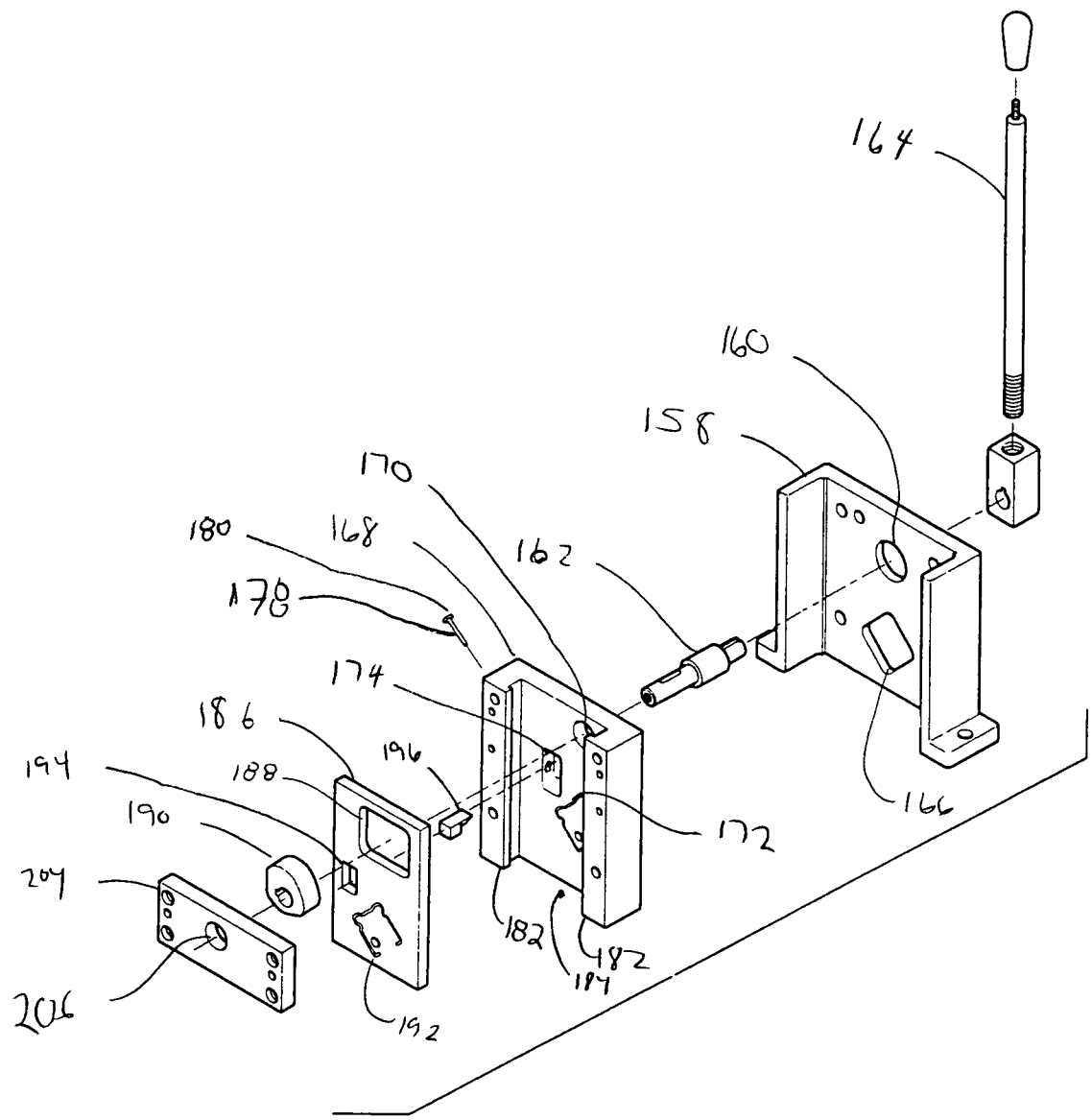
FIG. 18 is an exploded perspective view of the vertical head rail cutting apparatus.

Referring now to FIGS. 13 and 18, the third cutting station 22 is adapted to trim the length of a vertical head rail. A vertical blind is commonly used to cover a doorway, with a head rail disposed across the top of the door way and blind slats extending downward.

The third cutting station 22 includes a support 158 fastened to the frame 114. The support 158 includes a handle hole 160 through which is rotatably disposed a handle shaft 162. A handle 164 is attached to the handle shaft 162. The support 158 also includes a head rail hole 166 through which can be inserted a head rail to be sized.

A fixed die 168 is fastened to the support 158. The fixed die 168 includes a handle hole 170 through which is rotatably disposed the handle shaft 162 and a head rail die opening 172 sized to receive the head rail. The fixed die 168 also includes a boss receiver hole 174. As seen best in FIGS. 15 and 21, a pin passageway 176 is disposed angularly between the boss receiver hole 174 and the head rail die opening 172. A pin 178 sits in the pin passageway 176 with the head 180 of the pin 176 in the boss receiver hole 174. The pin 178 can be used to punch a hole in the top of the head rail such that the vertical head rail can receive a valance, as will be detailed later. The fixed die 168 includes a pair of brackets 182 that define a channel 184 therebetween.

Referring back to FIG. 18, a movable die 186 is disposed within the channel 184. The movable die 186 includes a cam opening 188. A cam 190 is fixed to the end of the handle shaft 162 and sits in the cam opening 188. The movable die 186 includes a head rail die opening 192 sized to receive a vertical blind head rail and is aligned with the head rail die opening 172 of the fixed die 168. The movable die 186 further includes a block opening 194 that is aligned with the boss receiver hole 174 of the fixed die 168.

Figure 19:
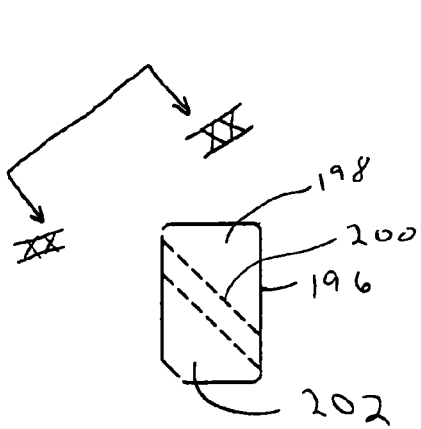
FIG. 19 is a detail view of the block of the vertical head rail cutting apparatus.
Figure 20:
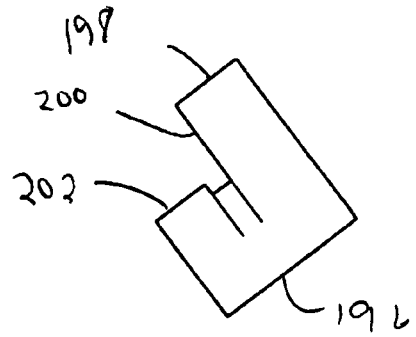
FIG. 20 is a view taken along line XX-XX of the block of FIG. 18.

A block 196 is fixed inside the block opening 194. As is best shown in FIGS. 19 and 20, the block 196 includes a boss 198 that extends into the boss receiver hole 174 of the fixed die 168. The boss 198 includes a top angled surface 200 that is parallel to the top of the head 180 of the pin 178 and bears down on the head 180 of the pin 178 as the pin 178 sits in the pin passageway 176. The boss 198 further includes a finger 202 that extends under the head 180 of the pin 178.

A brace 204 is fastened to the fixed die 168 and includes a handle shaft hole 206. The brace maintains the cam 190 inside the cam opening 188 and supports the handle shaft 162.

To size the head rail of the vertical die, a user places the vertical head rail on the second support surface 26 and slides the head rail through the head rail hole 166 in the support 158, the head rail die opening 172 of the fixed die 168 and the head rail die opening 192 of the movable die 186, until, by reference to a scale, the desired length of the head rail is achieved. The user then rotates the long handle 164, which rotates the cam 190 inside the cam opening 188 of the movable die 186. The cam 190 forces the movable die 186 downward. This displaces the head rail die opening 192 of the movable die 186 relative to the head rail die opening 172 of the fixed die 168, thereby shearing the head rail.

Figure 15:
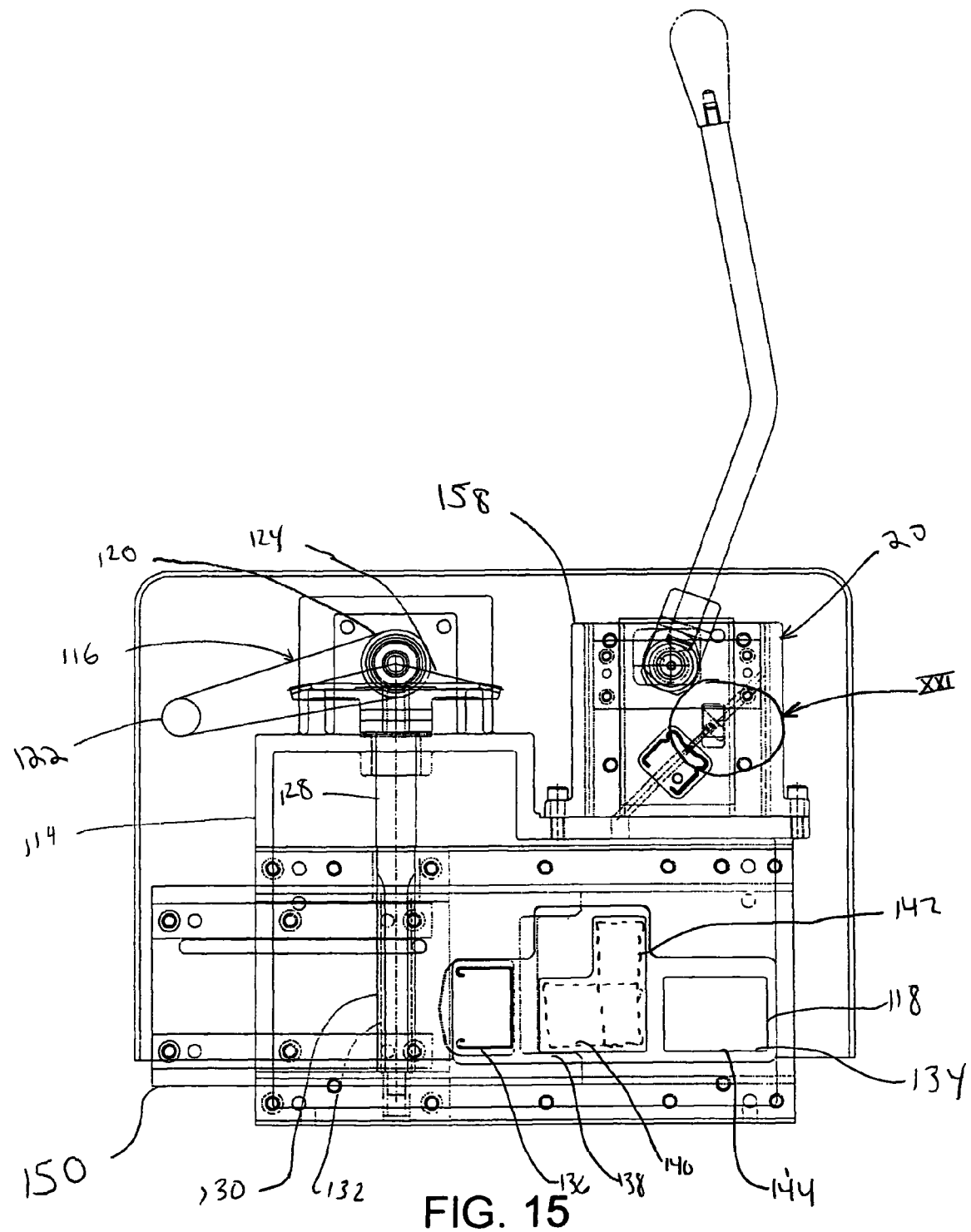
FIG. 15 is an elevational front view of the second and third cutting station.
Figure 16:
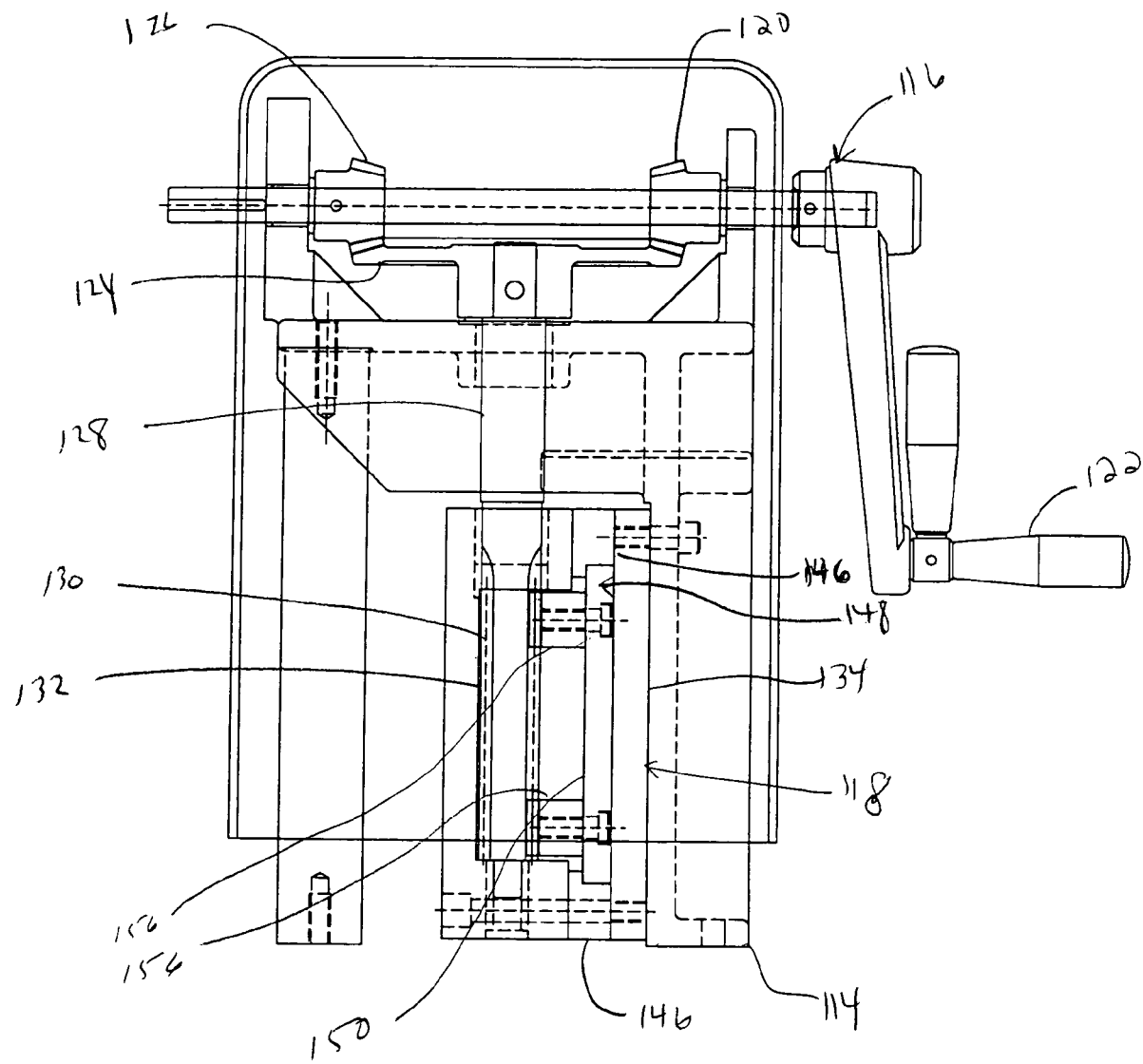
FIG. 16 is an elevational side view of the second cutting station.
Figure 21:
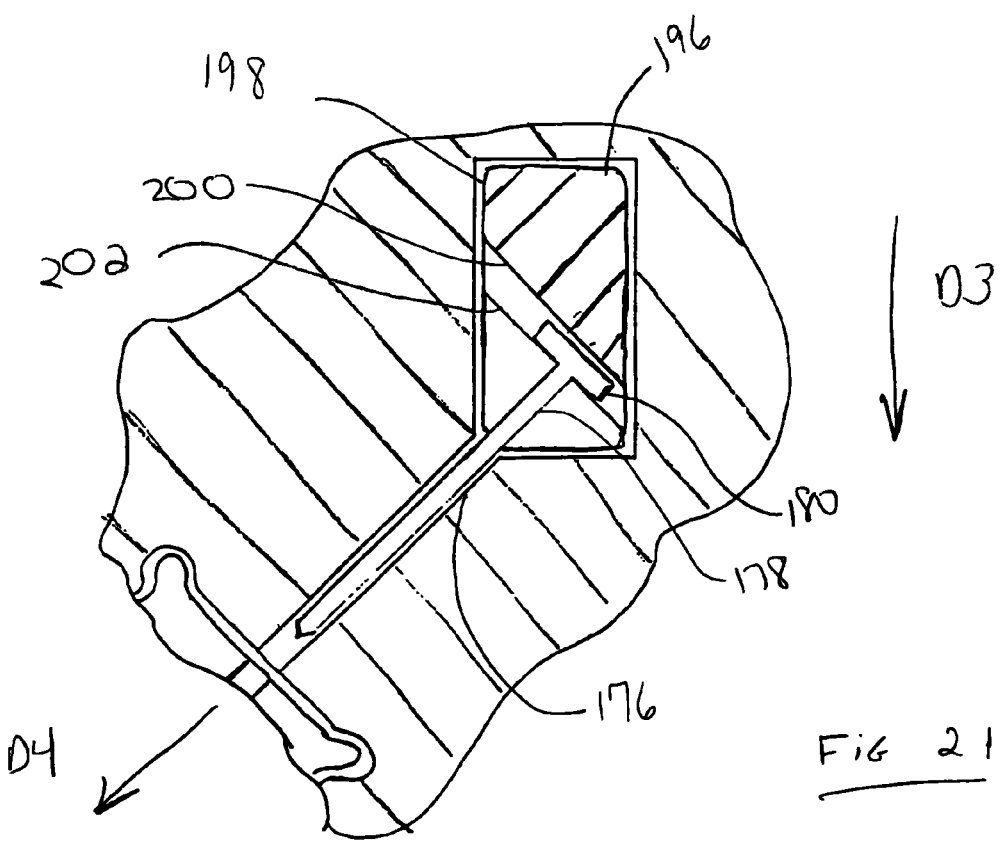
FIG. 21 is a fragmentary cross-sectional detail view of the block and pin taken along line XXI-XXI in FIG. 15.

The block 196 is also pushed downward in a direction D3 (See FIGS. 15 and 21). As the block 196 is forced downward, the boss 198 moves in direction D3 inside the boss receiver hole 174 of the fixed die 168. The top surface 200 of the boss 198 engages the head 180 of the pin 178 and forces the pin 178 through the pin passageway 176 in a direction D4 as it slides along the top surface 200 of the boss 198 and pierces the top of the head rail.

As the handle 164 is returned to its original position, the cam 190 lifts the movable die 186. The finger of the block engages the underside of the head 180 of the pin 178 and pulls the pin 178 back out away from the head rail die opening 172. The hole in the vertical blind head rail allows for a valance to be attached to the head rail for an improved aesthetic appearance.

From the foregoing, one of ordinary skill in the art will appreciate that the present disclosure sets forth a blind cutting center and a method of sizing a window covering. However, one of ordinary skill in the art could readily apply the novel teachings of this disclosure to any number of situations in which this device could be used. As such, the teachings of this disclosure shall not be considered to be limited to the specific examples disclosed herein, but to include all applications within the spirit and scope of the invention.

What is claimed is:

1. A window covering cutting apparatus, comprising:
a support surface;
a moveable frame disposed at an end of the support surface, the movable frame moving through a passage in the support surface; and
a fixed die fastened to the frame, the fixed die having an opening sized to receive an end of a window covering, and a movable die fastened to the frame, the movable die being movable relative to the fixed die, the fixed die having two regions and the movable die having two regions, each region for cutting a different type of window covering;
wherein the frame is configured to move relative to the support surface such that a selected region is adjacent the support surface, a non-selected region is not adjacent the support surface; and
wherein with an end of the window covering received in the fixed die, movement of the movable die relative to the fixed die can cut the end of the window covering received in the fixed die.

2. The apparatus of claim 1, wherein the frame is configured to move vertically.

3. The apparatus of claim 2, further comprising a lift-assist system that offsets the weight of the frame.

4. The apparatus of claim 1, further comprising a ram, wherein the ram is configured to engage and drive the moveable die relative to the fixed die, thereby creating a shearing action.

5. The apparatus of claim 1, wherein the moveable die includes a first cutting surface.

6. The apparatus of claim 5, wherein the moveable die includes a second cutting surface.

7. The apparatus of claim 6, wherein the second cutting surface includes a blade fastened to the movable die.

8. The apparatus of claim 1, wherein each die is removably affixed to the frame.

9. The apparatus of claim 1, wherein an opening in the first region of the fixed die is configured to receive a window covering of a first style, and an opening in the second region of the fixed die is configured to receive a window covering of a second style.

10. The apparatus of claim 1, wherein an opening in the first region of the fixed die of the first die assembly is configured to receive a head rail of a window covering.

11. A window covering cutting apparatus, comprising:
a support surface configured to support a window covering; and
a frame disposed adjacent the support surface and vertically movable relative to the support surface, the frame moving vertically through a passage in the support surface, the frame including a fixed die that has an opening sized to receive an end of the window covering and a movable die that is movable relative to the fixed die, the fixed die and the movable die being attached to the frame, the fixed die having first and second regions for cutting different types of window coverings and the movable die having first and second regions that interact with the first and second regions of the fixed die respectively to cut different types of window coverings;
wherein the frame is configured to move vertically relative to the support surface such that a selected region is adjacent the support surface, a non-selected region is not adjacent the support surface; and
wherein with the window covering disposed on the support surface, an end of the window covering received in the fixed die is sizeable by movement of the movable die relative to the fixed die.

12. The apparatus of claim 11, further comprising a lift-assist system that offsets the weight of the frame.

13. The apparatus of claim 11, further comprising a ram, wherein the ram is configured to engage and drive the moveable die relative to the fixed die, thereby creating a shearing action.

* * * * *